(12) United States Patent
Obara

(10) Patent No.: US 6,582,129 B2
(45) Date of Patent: Jun. 24, 2003

(54) COMPOUND BEARING APPARATUS, AND SPINDLE MOTOR AND SWING ARM FOR HARD DISK DRIVE MEANS INCLUDING SUCH BEARING APPARATUS

(75) Inventor: Rikuro Obara, Miyota-machi (JP)

(73) Assignee: Minebea Kabushiki Kaisha, Nagano-Ken (JP)

( * ) Notice: Subject to any disclaimer, the term of this patent is extended or adjusted under 35 U.S.C. 154(b) by 0 days.

(21) Appl. No.: 09/931,766

(22) Filed: Aug. 20, 2001

(65) Prior Publication Data

US 2002/0054720 A1 May 9, 2002

Related U.S. Application Data

(63) Continuation-in-part of application No. 09/379,502, filed on Aug. 23, 1999, now abandoned.

(30) Foreign Application Priority Data

Aug. 27, 1998 (JP) .......................................... 10-242209

(51) Int. Cl.[7] .............................................. F16C 33/80
(52) U.S. Cl. ..................................... 384/480; 384/488
(58) Field of Search ................................. 384/480, 488, 384/477, 504, 505, 506

(56) References Cited

U.S. PATENT DOCUMENTS

| 4,810,108 A | * | 3/1989 | Yajima ....................... 384/488 |
| 4,827,168 A | * | 5/1989 | Nakajima ................... 384/488 |
| 4,898,480 A | * | 2/1990 | Raj et al. .................... 384/446 |
| 5,547,291 A | | 8/1996 | Miyazaki et al. |
| 5,588,753 A | | 12/1996 | Kinoshita et al. |
| 6,102,575 A | * | 8/2000 | Obara ....................... 384/480 |
| 6,402,387 B2 | * | 6/2002 | Obara ....................... 384/480 |

FOREIGN PATENT DOCUMENTS

EP 0 752537 1/1997

* cited by examiner

Primary Examiner—Christopher P. Schwartz
Assistant Examiner—Melanie Torres
(74) Attorney, Agent, or Firm—Israel Gopstein

(57) ABSTRACT

The object of the present invention is to provide a compound bearing apparatus having arrangements for preventing the lubricant present around the rotating bodies from leaking out to the outside as well as the interior space between two rows of rotating bodies of the bearing apparatus. This is effected for the purpose of providing the compound bearing apparatus and a spindle motor and a swing arm assembly for a hard disk drive device including such bearing apparatus in which the sufficient amount of lubricant can be retained around the rotating bodies to obtain long life feature and having substantially no noise or vibration due to the loss of lubricant.

The compound bearing apparatus in accordance with the present invention includes a stepped shaft 1 having enlarged diameter shaft portion 1a and reduced diameter shaft portion 1b, a sleeve outer race 2 surrounding the stepped shaft, two rows of rotating bodies 3, 4 interposed therebetween, outer sealing plates 10, 11 provided on the outer side of each rotating bodies respectively, and inner sealing plates 13, 14 provided on the inner side of each rotating bodies respectively.

6 Claims, 5 Drawing Sheets

US 6,582,129 B2

COMPOUND BEARING APPARATUS, AND SPINDLE MOTOR AND SWING ARM FOR HARD DISK DRIVE MEANS INCLUDING SUCH BEARING APPARATUS

This application is a Continuation-in-part of application Ser. No. 09/379,502, filed on Aug. 23, 1999, now abandoned.

BACKGROUND OF THE INVENTION

1. Technical Field

The present invention relates to a compound bearing apparatus suitable for the rotating portion of the so called precision mechanical equipment, and a spindle motor and a swing arm for hard disk drive means including such bearing apparatus.

2. Description of the Prior Art

A variety of structures of the bearing apparatus are known for the rotating portion of the precision mechanical equipment. In the case of the prior art as shown in FIG. 7, the compound bearing apparatus of one prior art includes a stepped shaft 41 having enlarged and reduced diameter shaft portions 41a, 41b, a sleeve outer race 42 surrounding the stepped shaft, and two rows of rotating bodies 44,45 interposed between the enlarged diameter shaft portion 41a and the sleeve outer race 42, and an inner race 43 fitted around the reduced diameter shaft portion 41b and the sleeve outer race 42 respectively.

In such compound bearing apparatus of the prior art, the clearance defined between the enlarged diameter shaft portion of the shaft and the sleeve outer race and that defined between the inner race and the sleeve outer race are closed by means of sealing plates 46,47 at the outer side of each of two rows of rotating bodies. This is effected for the purpose of preventing the lubricant presented around the balls 44,45, rolling recess 48a, 48b, 49a, 49b, and the retainer 50 from leaking out therefrom.

In the compound bearing apparatus of the prior art having above-mentioned structure, often caused is the shortage of the lubricant due to the dispersion thereof into the space A defined between two rows of balls 44, 45. This also causes the rotational noise or vibration and reduces the lifetime of the bearing apparatus.

When the spindle motor including such compound bearing apparatus of the prior art is used as a driving apparatus for a hard disk drive device, the lubricant dispersed by the high speed rotation of the bearing apparatus into the space A will transform into a mist of lubricant and produce a turbulence. This turbulence will produce noises or vibration to affect the stillness and the accuracy of the rotation of the motor.

Further, in the swing arm assembly employed as a swing arm for the hard disk drive device, it is necessary to displace the magnetic head accurately along the surface of the hard disk used as a magnetic storage medium by swinging the arm around the shaft accurately. Whereas the swing arm assembly including a compound bearing apparatus of the prior art is apt to produce rotational noises or vibrations due to the age deterioration of the compound bearing apparatus. These rotational noises or vibrations will often lead to a disk crash to impair the reliability of the hard disk drive means.

Accordingly, the object of the present invention is to provide a compound bearing apparatus having sealing means for preventing the lubricant presented around the rotating bodies from leaking out to the space defined between two rows of the rotating bodies as well as the out side of the bearing apparatus, and a spindle motor and a swing arm for hard disk drive means including such bearing apparatus.

SUMMARY OF THE INVENTION

These and other objects are achieved by a compound bearing apparatus in accordance with the first aspect of the present invention including a stepped shaft having an enlarged diameter shaft portion and reduced diameter shaft portion, a sleeve outer race surrounding the stepped shaft, and two rows of rotating bodies interposed therebetween, wherein:

the rotating bodies of the first row are disposed between an outer peripheral rolling recess formed directly on an outer peripheral surface of the enlarged diameter shaft portion and a first inner peripheral rolling recess formed directly on the inner peripheral surface of the sleeve outer race, the rotating bodies of the second row are disposed between an outer peripheral rolling recess formed on an outer periphery of an inner race fitted over the reduced diameter shaft portion of said stepped shaft and a second inner peripheral rolling recess formed directly on the inner peripheral surface of the sleeve outer race, an outer peripheral labyrinth recess formed on the outer peripheral surface of the enlarged diameter shaft portion at the longitudinal inner side of the rotating bodies of the first row, a space defined between a shoulder, formed at a point of transition from the enlarged diameter shaft portion to the reduced diameter shaft portion, and an inner end of the inner race, at the longitudinal outer side of the rotating bodies of the first row, a first outer sealing plate of ring shape having a central aperture is fixedly fitted at its outer periphery into an inner peripheral groove formed on the inner peripheral surface of the sleeve outer race, the inner diameter of the central aperture is slightly larger than the enlarged diameter shaft portion to prevent the first outer sealing plate from contact with the stepped shaft and to provide a labyrinth seal function, at the longitudinal outer side of the rotating bodies of the second row, a second outer sealing plate of ring shape having a central aperture is fixedly fitted at its outer periphery into an inner peripheral groove formed on the inner peripheral surface of the sleeve outer race, the inner diameter of the central aperture is substantially equal to or smaller than the outer diameter of the inner race and larger than the outer diameter of the reduced diameter shaft portion to provide a labyrinth seal function, at the longitudinal inner side of the rotating bodies of the first row, a first inner sealing plate of ring shape having a central aperture is fixedly fitted at its outer periphery into an inner peripheral groove formed on the inner peripheral surface of the sleeve outer race, the inner diameter of the central aperture is substantially equal to or smaller than the outer diameter of the enlarged diameter shaft portion and larger than the outer diameter of the labyrinth recess to prevent the first inner sealing plate from contact with the stepped shaft to provide a labyrinth seal function, at the longitudinal inner side of the rotating bodies of the second row, a second inner sealing plate of ring shape having a central aperture is fixedly fitted at its outer periphery into an inner peripheral groove formed on the inner peripheral surface of the sleeve outer race, the inner diameter of the central aperture is substantially equal to or smaller than the outer diameter of the inner ring and larger than the outer diameter of the reduced diameter shaft portion of the stepped shaft to prevent the second inner sealing plate from contact with the stepped shaft or the inner race to provide a labyrinth seal function.

Further, a compound bearing apparatus in accordance with the second aspect of the present invention including a stepped shaft having enlarged diameter shaft portion and reduced diameter shaft portion, a sleeve outer race surrounding the stepped shaft, and two rows of rotating bodies interposed therebetween, wherein:

the rotating bodies of the first row are disposed between an outer peripheral rolling recess formed directly on an outer peripheral surface of the enlarged diameter shaft portion and a first inner peripheral rolling recess formed directly on the inner peripheral surface of the sleeve outer race, the rotating bodies of the second row are disposed between an outer peripheral rolling recess formed on an outer periphery of an inner race fitted over the reduced diameter shaft portion of said stepped shaft and a second inner peripheral rolling recess formed directly on the inner peripheral surface of the sleeve outer race, a space defined between a shoulder, formed at a point of transition from the enlarged diameter shaft portion to the reduced diameter shaft portion, and an inner end of the inner race, at the longitudinal outer and inner side of the rotating bodies of the first row, a pair of first outer and inner sealing plates of ring shape having a central aperture respectively are fitted at their inner peripheries into a pair of peripheral grooves formed on each side of the peripheral rolling recess formed on the outer peripheral surface of the enlarged diameter shaft portion so as to be faced opposite to a pair of outer and inner peripheral grooves formed on each side of the first inner peripheral rolling recess of the sleeve outer race respectively, the outer diameter of the central aperture is substantially equal to or larger than the inner diameter of the sleeve outer race and smaller than the outer diameter of the inner peripheral grooves respectively to prevent the first inner and second sealing plates from contact with the sleeve outer race to provide a labyrinth seal function, at the longitudinal outer side of the rotating bodies of the second row, a second outer sealing plate of ring shape having a central aperture is fixedly fitted at its outer periphery into a peripheral groove formed on the outer side of the second inner peripheral rolling recess formed on the inner peripheral surface of the sleeve outer race so as to be faced opposite to an outer side of the inner race, the inner diameter of the central aperture is substantially equal to or smaller than the outer diameter of the inner race and larger than the outer diameter of the reduced diameter shaft portion of the stepped shaft to prevent the second outer sealing plate from contact with the stepped shaft or the inner race to provide a labyrinth seal function, at the longitudinal inner side of the rotating bodies of the second row, a second inner sealing plate of ring shape having a central aperture is fixedly fitted at its outer periphery into a peripheral groove formed on inner side of the second inner peripheral rolling recess formed on the inner peripheral surface of the sleeve outer race so as to be faced opposite to the space between the stepped shaft and the inner race, the inner diameter of the central aperture is substantially equal to or smaller than the outer diameter of the inner race and larger than the outer diameter of the reduced diameter shaft portion of the stepped shaft to prevent the second inner sealing plate from contact with the stepped shaft or the inner race to provide a labyrinth seal function.

The spindle motor in accordance with the present invention includes a compound bearing apparatus of the structure of either of the above-mentioned structures. The rotor hub, the rotating member of the spindle motor is adapted to be journalled on the base by the compound bearing apparatus.

The swing arm in accordance with the present invention includes a compound bearing apparatus of the structure of either of the above-mentioned structures. The compound bearing apparatus is fitted within the cylindrical portion being the base of the swing arm to journal the swing arm rotatably.

The above-mentioned compound bearing apparatus is configured so that said outer peripheral labyrinth recess, said space defined between said shoulder and said inner end of the inner race, said first inner sealing plate and said second inner sealing plate cooperate to reduce dispersion of lubricant from said rolling bodies into a space between said two rows of rotating bodies.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

A compound bearing apparatus in accordance with the first and second embodiments of the present invention will now be described with reference to FIGS. 1 and 2.

The First Embodiment

Figure 1:
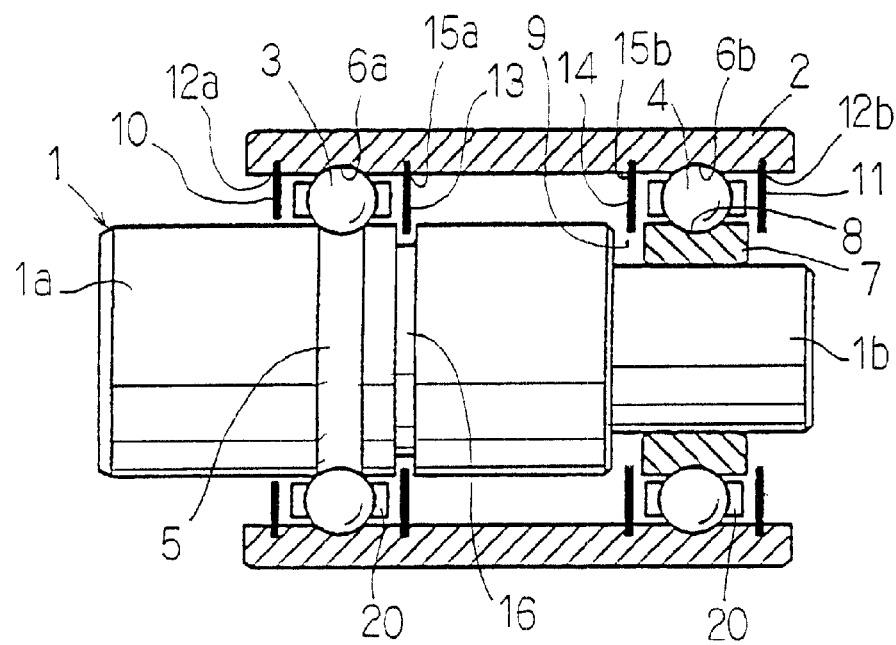
FIG. 1 is a longitudinal cross sectional view showing the compound bearing apparatus of the present invention.

As can be seen from FIG. 1, the compound bearing apparatus of the first embodiment includes a stepped shaft 1 having an enlarged diameter shaft portion 1a and a reduced diameter shaft portion 1b, a cylindrical sleeve outer race 2 surrounding over the stepped shaft, and two rows of rotating bodies such as balls 3, 4 interposed therebetween.

The balls 3 of the first row (the left row in FIG. 1) are disposed between an outer peripheral rolling recess 5 formed directly around the outer peripheral surface of the enlarged diameter shaft portion 1a of said stepped shaft 1 and the first inner peripheral rolling recess 6a formed directly on the inner peripheral surface of said sleeve outer race 2.

The balls 4 of the second row (the right row in FIG. 1) are disposed between an outer peripheral rolling recess 8 provided around the outer peripheral surface of the inner race 7 fitted over the reduced diameter shaft portion 1b said stepped shaft 1 and the second inner peripheral rolling recess 6b formed directly on the inner peripheral surface of the sleeve outer race 2.

The outer diameter of said inner race 7 is substantially identical with that of the enlarged diameter shaft portion 1a, so that the balls of the same diameter can be employed as the balls 3, 4 of the first and second rows.

The inner race 7 may be attached to the shaft to leave a space 9 between an inner end of the inner race and a surface of the shoulder formed between the enlarged portion and reduced portion of the shaft.

On the left end of the bearing assembly, i.e. on one end left to the first row of balls 3, first outer sealing plate 10 is provided to seal the clearance defined between the enlarged diameter shaft portion 1a and the sleeve outer race 2. On the right end of the bearing assembly, i.e. on the other end right to the second row of balls 4, second outer sealing plate 11 is provided to seal the clearance defined between the inner race 7 and the sleeve outer race 2. The outer sealing plates 10, 11 are ring shaped and each has a central aperture therethrough. The outer periphery of the outer sealing plates 10, 11 are adapted to be fitted into inner peripheral grooves 12a, 12b formed on the inner peripheral surface of said sleeve outer race 2.

The inner diameter of the central aperture of the outer sealing plate 10 is slightly larger than the outer diameter of the enlarged diameter shaft portion 1a to leave a slight clearance therebetween to provide a labyrinth seal function.

The inner diameter of the central aperture of the outer sealing plate 11 is slightly larger than the outer diameter of the inner race 7 to leave a slight clearance therebetween to provide a labyrinth seal function.

The compound bearing apparatus of the present invention further includes first and second inner sealing plates 13, 14. The first inner sealing plate 13 is disposed right to the first row of balls 3, and the second inner sealing plate 14 is disposed left to the second row of balls 4.

These inner sealing plates 13, 14 are also of ring shaped and has a central aperture therethrough. The outer periphery of the inner sealing plates 13, 14 are fitted into inner peripheral grooves 15a, 15b formed on the inner peripheral surface of said sleeve outer race 2.

An outer peripheral labyrinth recess 16 is formed around the enlarged diameter shaft portion 1a at the position in which the plane defined by the first inner sealing plate 13 crosses the shaft 1. The inner diameter of the inner sealing plate 13 is substantially equal to or smaller than the outer diameter of the enlarged diameter shaft portion 1a and larger than the inner diameter of the labyrinth recess 16 to prevent the first inner sealing plate from contact with the shaft. Thus the inner periphery of the central aperture is entered into the labyrinth recess to provide the labyrinth seal function.

The inner periphery of the second inner sealing plate 14 is disposed opposite to the space 9 defined between the inner end of the inner race 7 and the surface of the shoulder. The inner diameter of the inner sealing plate 14 is substantially equal to or smaller than the outer diameter of the enlarged diameter shaft portion 1a and larger than the outer diameter of the reduced diameter shaft portion 1b to prevent the second inner sealing plate from contact with the shaft. Thus the inner periphery of the central aperture is entered into the space 9 between the stepped shaft and inner race to provide the labyrinth seal function.

The elements represented by reference numeral 20 are ball retainers.

The assembling operation of the compound bearing apparatus of the above-mentioned first embodiment will be carried out as follows.

The outer periphery of the inner sealing plates 13 and 14 are fitted into the inner peripheral grooves 15a, 15b of the sleeve outer race 2, the stepped shaft 1 is inserted into the sleeve outer race 2, and then inner race 7 is fitted slidably around the reduced diameter shaft portion 1b of the stepped shaft.

Next, the stepped shaft 1 is displaced radially within the sleeve outer race to form a gap greater than the diameter of balls 3, 4 therebetween, and then these balls are loaded therethrough.

In this step of the assembling operation, the inner sealing plate 13 secured on the inner side of balls 3 of the first row is adapted to be entered into the outer peripheral labyrinth groove 16 and the inner sealing plate 14 secured on the inner side of balls 4 of the second row is adapted to be entered into the space 9 defined between inner end of the inner race 7 and the surface of the shoulder, so that the second inner sealing plate does not interfere with the radial displacement of the stepped shaft, and the loading of the balls 3, 4 can be effected easily.

After loading the predetermined number of balls, the balls are located equidistantly with each other by means of ball retainers 20, 20, and then the inner race 7 is bonded to the reduced diameter shaft portion under a predetermined pressure, and outer sealing plates 10, 11 are also fitted into the inner peripheral grooves 12a, 12b of the sleeve outer race and secured thereto.

The Second Embodiment

Figure 2:
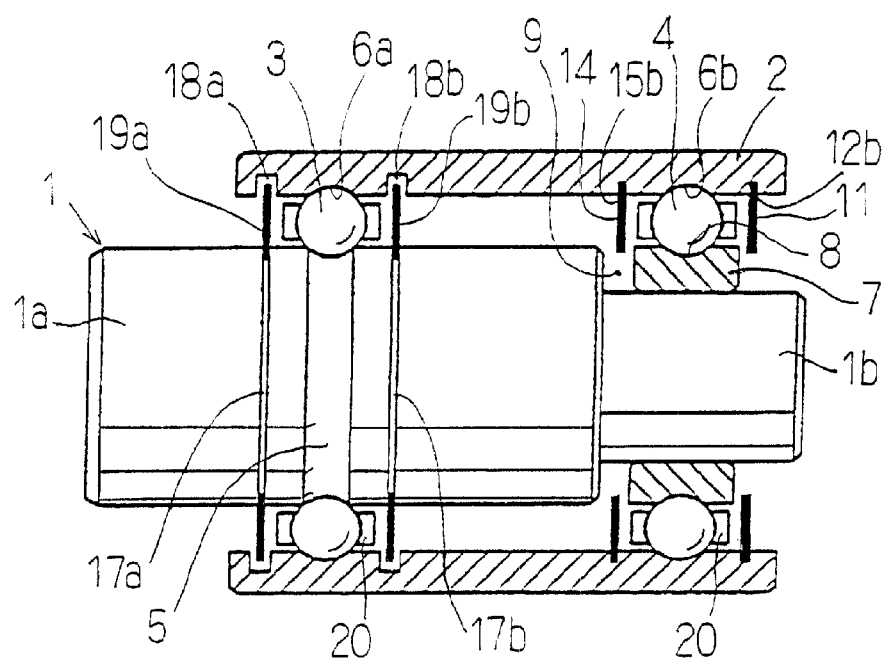
FIG. 2 is a longitudinal cross sectional view showing another embodiment of the compound bearing apparatus of the present invention.

Although the inner and outer sealing plates disposed on the opposite side of balls 3 of the first row are mounted on the inner and outer sealing sleeve outer race 2, the inner and outer sealing plates can be mounted on the enlarged diameter shaft portion 1a as shown in FIG. 2.

A pair of outer peripheral grooves 17a, 17b are formed distally and proximally to the outer peripheral rolling recess 5 formed on the enlarged diameter shaft portion 1a. Inner peripheral labyrinth grooves 18a, 18b are formed on the portions of the inner peripheral surface of the sleeve outer race 2 crossed with the planes including the outer peripheral grooves. Outer and inner sealing plates 19a, 19b including a central aperture respectively are fitted at their inner periphery into the outer peripheral grooves 17a, 17b. The outer diameter of the sealing plates 19a, 19b are substantially equal to or larger than the inner diameter of the sleeve outer race 2 and smaller than the outer diameter of the grooves 17a, 17b to prevent the inner sealing plates from contact with the sleeve outer race. Thus the outer peripheries of the sealing plates are entered into the grooves 17a, 17b to provide the labyrinth seal function.

The assembling operation of the compound bearing apparatus of the above mentioned second embodiment is adapted to be carried out as follows.

The inner periphery of the inner sealing plate 19b is fitted into the outer peripheral groove 17b formed on the enlarged diameter shaft portion 1a interior to the outer peripheral rolling recess 5, and the outer periphery of the inner sealing plate 14 is fitted into the inner peripheral groove 15b of the sleeve outer race 2, and then the stepped shaft 1 is inserted with the first inner sealing plate into the sleeve outer race 2, and the inner race 7 is fitted slidably around the reduced diameter shaft portion 1b of the stepped shaft.

Next, the stepped shaft 1 is displaced radially within the sleeve outer race to form a gap greater than the diameter of balls 3, 4 therebetween, and then these balls are loaded therethrough into the inner and outer rolling recess.

In this step of the assembling operation, the inner sealing plate 19b secured on the inner side of balls 3 of the first row is adapted to be entered into the inner peripheral labyrinth groove 18b and the inner sealing plate 14 secured on the inner side of balls 4 of the second row is adapted to be entered into the space 9 defined between inner and surface of the inner race 7 and the surface of the shoulder, so that the inner sealing plates does not interfere with the radial displacement of the stepped shaft, and the loading of the balls 3,4 can be effected easily.

After loading the predetermined number of balls, the balls are located equidistantly with each other by means of ball retainers 20, 20, and then the inner race 7 is bonded to the reduced diameter shaft portion under the predetermined pressure, and outer sealing plate 19a is fitted into the outer peripheral groove 17a of the enlarged shaft portion 1a, and the outer sealing plate 11 is fitted into the inner peripheral groove 12b of the sleeve outer race 2 and secured thereto.

Although balls are employed as rotating bodies in the above-mentioned first and second embodiments, rollers can also be employed to accomplish the same function.

The Embodiment of the Spindle Motor

Figure 3:
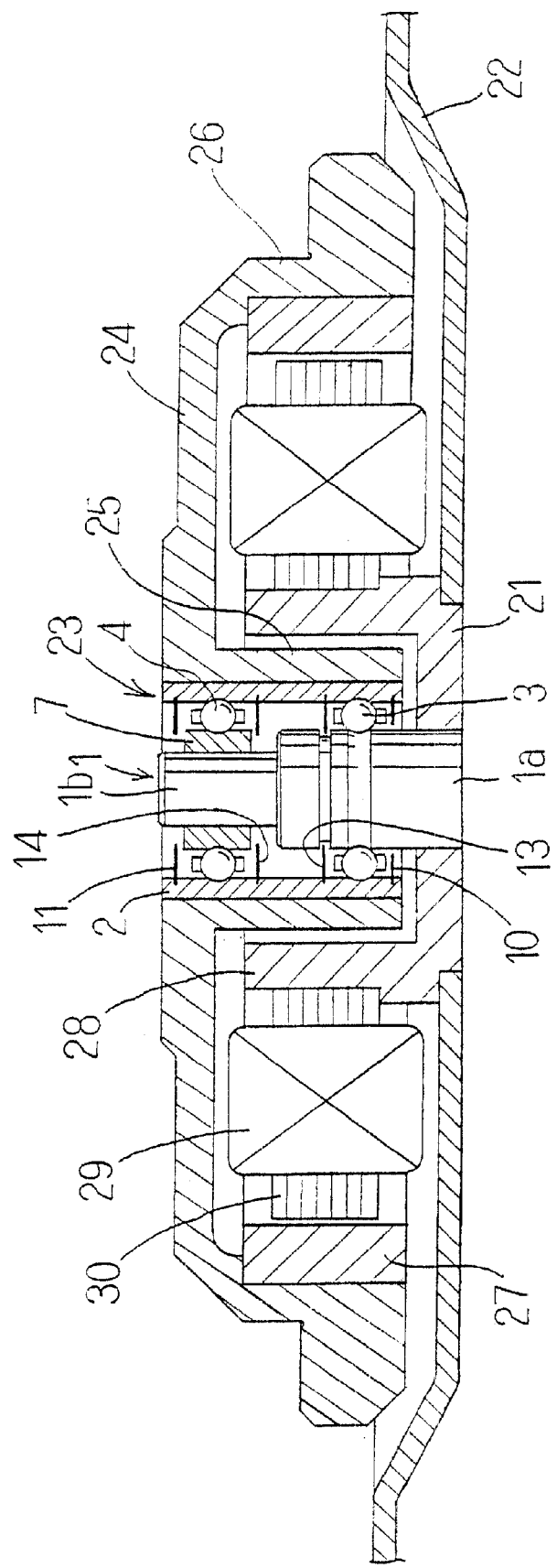
FIG. 3 is a longitudinal cross sectional view showing the spindle motor of the present invention.

The spindle motor for the hard disk drive device including the compound bearing apparatus of the above-mentioned first embodiment will now be described with reference to FIG. 3.

A compound bearing apparatus 23 is secured centrally on a base 31 to extend vertically therefrom with locating the enlarged diameter shaft portion of the bearing at the bottom end thereof. The base 21 is provided with a flange 22 at the outer periphery thereof. A rotor hub 24 i.e. a rotating member of the motor includes on its central lower surface a cylindrical central portion 25 having an upper and lower openings. The cylindrical portion is formed integrally with the rotor hub with using the same member. The cylindrical portion 25 is fitted over the sleeve outer race 2 of the compound bearing apparatus 23.

The rotor hub 24 is provided around the outer Periphery thereof with a downwardly around the outer 26 having a disk mount portion for the disk or disks of the hard disk drive device. The inner peripheral surface of the downwardly depending flange is provided with rotor magnets 27 made of permanent magnets.

Stators 30 having a coil 29 wound respectively therearound are secured around the yoke holder 28 formed integrally with the base to extend upwardly therefrom with leaving a slight clearance between the outer peripheral portion of the stators and the inner peripheral surface of the rotor magnets 27. In this connection, the rotor hub is adapted to be rotatably driven by energizing the coils 29.

The assembling procedure of the spindle motor of the present invention will be effected as mentioned below. The compound bearing apparatus 23 is press fitted and adhesively secured within the central cylindrical portion of the rotor hub 24. The base or lower end of the enlarged diameter shaft portion 1a of the stepped shaft 1 of the compound bearing apparatus is press fitted and adhesively secured within the bore of the base 21.

In the above-mentioned case, the stepped shaft 1 of the compound bearing apparatus is adapted to be secured to the base 21 so that the sleeve outer race 2 is adapted to be rotated together with the rotor hub 24, i.e. the spindle motor is of shaft securing type. The spindle motor can also be of a shaft rotating type, in which the sleeve 2 is secured to the base 21 and the stepped shaft 1 is adapted to be rotated together with the rotor hub 24.

Figure 4:
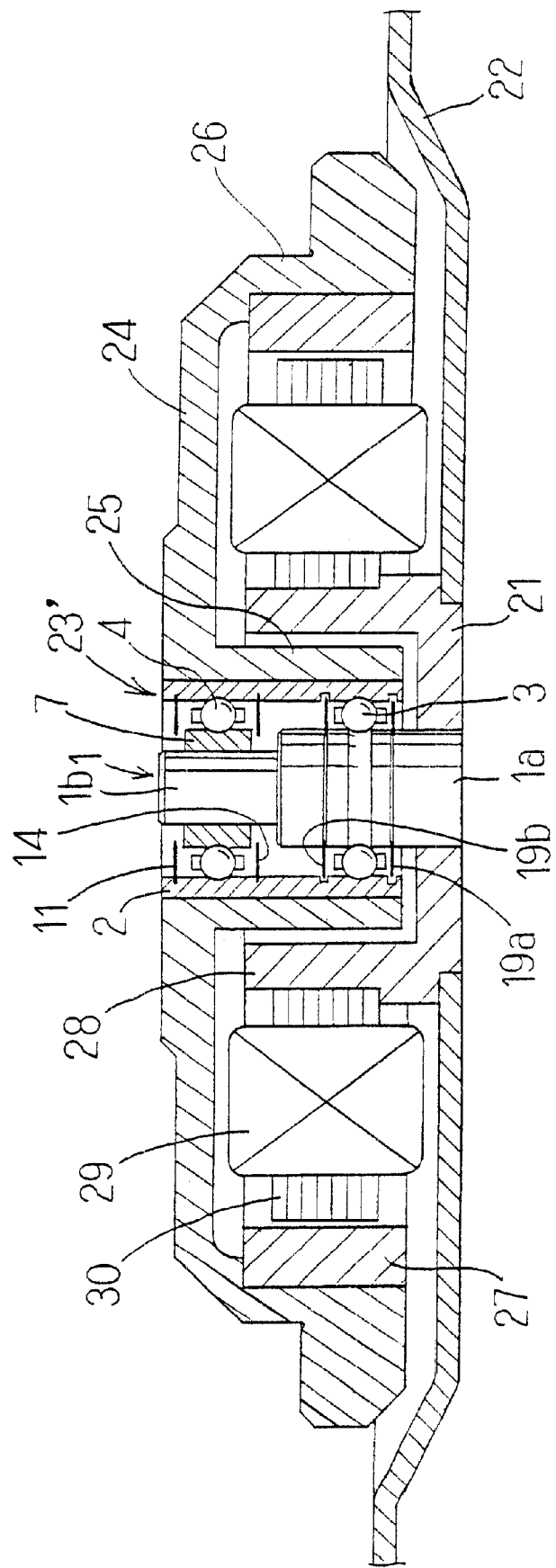
FIG. 4 is a longitudinal cross sectional view showing another embodiment of the spindle motor of the present invention.

Further although the compound bearing apparatus in accordance with the above-mentioned first embodiment as shown in FIG. 1 is employed in the embodiment of the spindle motor, the compound bearing apparatus 23' in accordance with the second embodiment as shown in FIG. 2 can also be used as shown in FIG. 4.

Embodiment of Swing Arm Assembly

Figure 5:
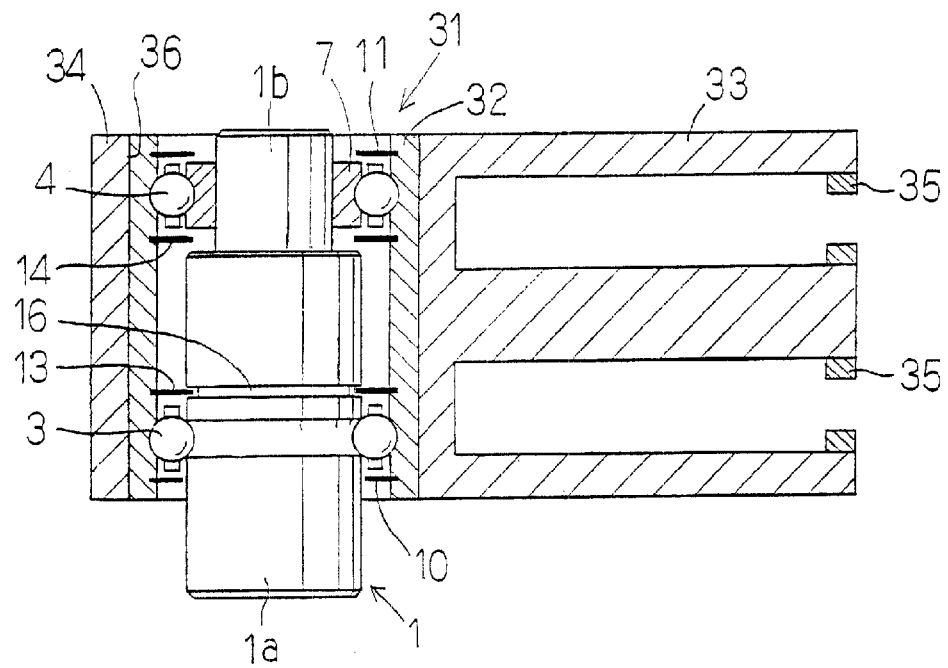
FIG. 5 is a longitudinal cross sectional view showing the swing arm assembly of the present invention.

A swing arm assembly for hard disk drive means is illustrated in FIG. 5. This swing arm assembly includes the compound bearing apparatus of the above-mentioned first embodiment.

A base Or a cylindrical portion 34 of a swing arm 33 is secured to the sleeve outer race 32 of the compound bearing apparatus 31. The swing arm 33 has mounts 35, 35 for carrying the magnetic head of the hard disk drive device at its distal portion.

The compound bearing apparatus 31 is press fitted and adhesively secured within the bore 36 of the cylindrical portion 34 with interposing adhesive between the outer peripheral surface of the sleeve outer race 32 and the inner peripheral surface of the bore of the hub 34.

In the swing arm assembly of the construction as described above, magnetic heads (not shown) are adapted to be attached to the mounts 35, 35 for carrying the magnetic head, and the lower end of the enlarged diameter shaft portion 1a of the compound bearing apparatus 31 is secured on the base (not shown) of the hard disk drive device. The swing arm assembly can be rotated around the shaft by means of any appropriate actuator.

Although the above-described swing arm assembly is of the shaft securing type in which the cylindrical portion 34 of the swing arm is secured around the sleeve outer race of the compound bearing apparatus and the stepped shaft is secured to the base of hard disk drive device, the swing arm assembly of the shaft rotating type in which the cylindrical portion 34 is secured to the stepped shaft and the sleeve outer race is secured to the base of hard disk drive device can also be used.

Figure 6:
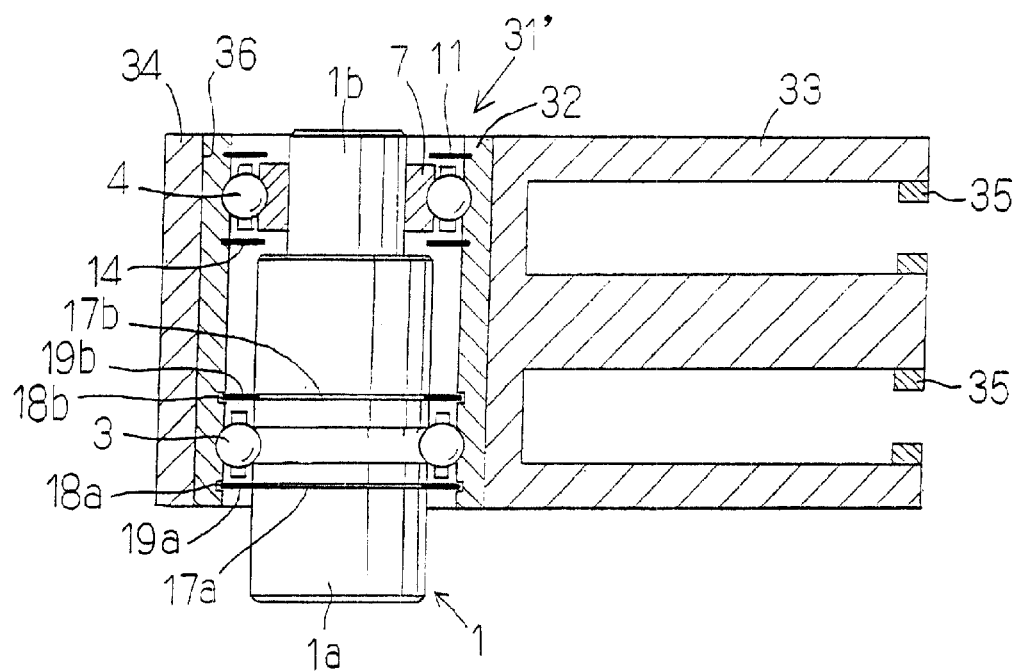
FIG. 6 is a longitudinal cross sectional view showing another embodiment of the swing arm assembly of the present invention.
Figure 7:
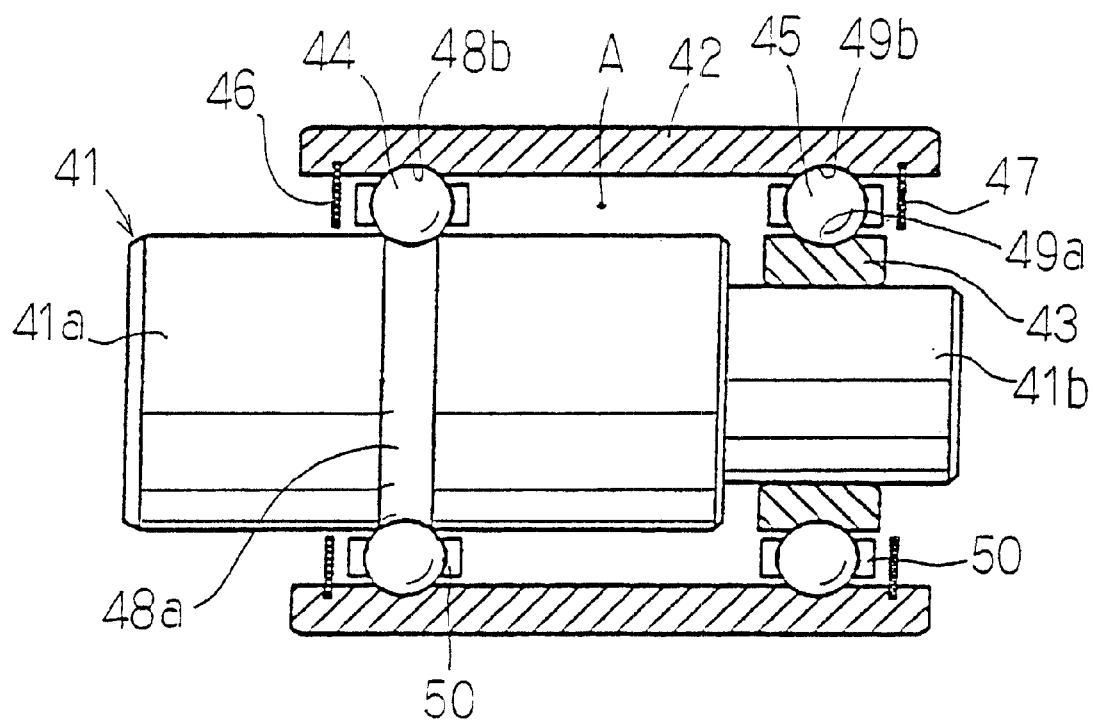
FIG. 7 is a longitudinal cross sectional view showing the compound bearing apparatus of the prior art.

In the above-mentioned embodiment of the swing arm assembly, the compound bearing apparatus of the first embodiment of type as shown in FIG. 1 is employed. Whereas, the compound bearing apparatus of the second embodiment of type as shown in FIG. 2 may also be employed as shown in FIG. 6.

The Advantages or Effects to be Obtained from the Present Invention

In accordance with the resent invention, the compound bearing apparatus includes sealing plates at the inner sides of each rotating bodies as well as at the outer sides, so that the lubricant presented around the rotating bodies, the rotating recess, and the retainers can be prevented from leaking out from the bearing apparatus. Thus, the compound bearing apparatus good at its stillness and long life can be obtained.

The labyrinth seal structure formed by the elements of the bearing apparatus such as inner and outer sealing plates the sleeve outer race, and the shaft does not produce frictional heat and does not affect the rotational torque, since there are no contact between the elements.

Further, the spindle motor of the present invention also includes the compound bearing apparatus of long life and maintaining high rotational precision for the long period of time. The assembling procedure of the spindle motor of the present invention can be effected easily only by press fit the compound bearing apparatus into the central cylindrical portion of the rotor hub and secured thereto by means of adhesive Additionally, the swing arm assembly of the present invention also includes the compound bearing apparatus of long life and maintaining high rotational precision for the long period of time, so that the reliability of hard disk drive device can be enhanced. The assembling procedure of the swing arm assembly of the present invention can be effected easily only by press fit the compound bearing apparatus into the cylindrical portion of the base of the swing arm and secured thereto by means of adhesive.

While particular embodiments of the present invention have been illustrated and described, it should be obvious to those skilled in the art that various changes and modifications can be made without departing from the spirit and scope of the invention.

What is claimed is:

1. A compound bearing apparatus including a stepped shaft having an enlarged diameter shaft portion and reduced diameter shaft portion, a sleeve outer race surrounding the stepped shaft, and two rows of rotating bodies interposed therebetween, wherein:
   the rotating bodies of the first row are disposed between an outer peripheral rolling recess formed directly on an outer peripheral surface of the enlarged diameter shaft portion and a first inner peripheral rolling recess formed directly on the inner peripheral surface of the sleeve outer race,
   the rotating bodies of the second row are disposed between an outer peripheral rolling recess formed on an outer periphery of an inner race fitted over the reduced diameter shaft portion of said stepped shaft and a second inner peripheral rolling recess formed directly on the inner peripheral surface of the sleeve outer race,
   an outer peripheral labyrinth recess formed on the outer peripheral surface of the enlarged diameter shaft portion at the longitudinal inner side of the rotating bodies of the first row,
   a space defined between a shoulder, formed at a point of transition from the enlarged diameter shaft portion to the reduced diameter shaft portion, and an inner end of the inner race,
   at the longitudinal outer side of the rotating bodies of the first row, a first outer sealing plate of ring shape having a central aperture is fixedly fitted at its outer periphery into an inner peripheral groove formed on the inner peripheral surface of the sleeve outer race,
   the inner diameter of the central aperture of said first outer sealing plate is slightly larger than the enlarged diameter shaft portion to prevent the first outer sealing plate from contact with the stepped shaft and to provide a labyrinth seal function,
   at the longitudinal outer side of the rotating bodies of the second row, a second outer sealing plate of ring shape having a central aperture is fixedly fitted at its outer periphery into an inner peripheral groove formed on the inner peripheral surface of the sleeve outer race,
   the inner diameter of the central aperture of said second outer sealing plate is substantially equal to or smaller than the outer diameter of the inner race and larger than the outer diameter of the reduced diameter shaft portion to provide a labyrinth seal function,
   at the longitudinal inner side of the rotating bodies of the first row, a first inner sealing plate of ring shape having a central aperture is fixedly fitted at its outer periphery into an inner peripheral groove formed on the inner peripheral surface of the sleeve outer race,
   the inner diameter of the central aperture of said first inner sealing plate is substantially equal to or smaller than the outer diameter of the enlarged diameter shaft portion and larger than the outer diameter of the labyrinth recess to prevent the first inner sealing plate from contact with the stepped shaft to provide a labyrinth seal function,
   at the longitudinal inner side of the rotating bodies of the second row, a second inner sealing plate of ring shape having a central aperture is fixedly fitted at its outer periphery into an inner peripheral groove formed on the inner peripheral surface of the sleeve outer race,
   the inner diameter of the central aperture of said second inner sealing plate is substantially equal to or smaller than the outer diameter of the inner ring and larger than the outer diameter of the reduced diameter shaft portion of the stepped shaft to prevent the second inner sealing plate from contact with the stepped shaft or the inner race to provide a labyrinth seal function.

2. The compound bearing apparatus recited in claim 1, wherein said outer peripheral labyrinth recess, said space defined between said shoulder and said inner end of the inner race, said first inner sealing plate and said second inner sealing plate cooperate to reduce dispersion of lubricant from said rolling bodies into a space between said two rows of rotating bodies.

3. A spindle motor including a rotating member rotor hub journalled on a base by means of a compound bearing apparatus, said compound bearing apparatus comprising:
   a stepped shaft having an enlarged diameter shaft portion and reduced diameter shaft portion, a sleeve outer race surrounding the stepped shaft, and two rows of rotating bodies interposed therebetween, wherein:
   the rotating bodies of the first row are disposed between an outer peripheral rolling recess formed directly on an outer peripheral surface of the enlarged diameter shaft portion and a first inner peripheral rolling recess formed directly on the inner peripheral surface of the sleeve outer race,
   the rotating bodies of the second row are disposed between an outer peripheral rolling recess formed on an outer periphery of an inner race fitted over the reduced diameter shaft portion of said stepped shaft and a second inner peripheral rolling recess formed directly on the inner peripheral surface of the sleeve outer race,
   an outer peripheral labyrinth recess formed on the outer peripheral surface of the enlarged diameter shaft portion at the longitudinal inner side of the rotating bodies of the first row,
   a space defined between a shoulder, formed at a point of transition from the enlarged diameter shaft portion to the reduced diameter shaft portion, and an inner end of the inner race, at the longitudinal outer side of the rotating bodies of the first row, a first outer sealing plate of ring shape having a central aperture is fixedly fitted at its outer periphery into an inner peripheral groove formed on the inner peripheral surface of the sleeve outer race, the inner diameter of the central aperture of said first outer sealing plate is slightly larger than the enlarged diameter shaft portion to prevent the first outer sealing plate from contact with the stepped shaft and to provide a labyrinth seal function, at the longitudinal outer side of the rotating bodies of the second row, a second outer sealing plate of ring shape having a central aperture is fixedly fitted at its outer periphery into an inner peripheral groove formed on the inner peripheral surface of the sleeve outer race, the inner diameter of the central aperture of said second outer sealing plate is substantially equal to or smaller than the outer diameter of the inner race and larger than the outer diameter of the reduced diameter shaft portion to provide a labyrinth seal function, at the longitudinal inner side of the rotating bodies of the first row, a first inner sealing plate of ring shape having a central aperture is fixedly fitted at its outer periphery into an inner peripheral groove formed on the inner peripheral surface of the sleeve outer race, the inner diameter of the central aperture of said first inner sealing plate is substantially equal to or smaller than the outer diameter of the enlarged diameter shaft portion and larger than the outer diameter of the labyrinth recess to prevent the first inner sealing plate from contact with the stepped shaft to provide a labyrinth seal function, at the longitudinal inner side of the rotating bodies of the second row, a second inner sealing plate of ring shape having a central aperture is fixedly fitted at its outer periphery into an inner peripheral groove formed on the inner peripheral surface of the sleeve outer race, the inner diameter of the central aperture of said second inner sealing plate is substantially equal to or smaller than the outer diameter of the inner ring and larger than the outer diameter of the reduced diameter shaft portion of the stepped shaft to prevent the second inner sealing plate from contact with the stepped shaft or the inner race to provide a labyrinth seal function.

4. The spindle motor recited in claim 3, wherein said compound bearing apparatus is configured so that said outer peripheral labyrinth recess, said space defined between said shoulder and said inner end of the inner race, said first inner sealing plate and said second inner sealing plate cooperate to reduce dispersion of lubricant from said rolling bodies into a space between said two rows of rotating bodies.

5. A swing arm assembly journalled rotatably on a base of a bard disk drive device through a compound bearing apparatus provided within a base cylindrical portion of a swing arm, said compound bearing apparatus comprising:

a stepped shaft having an enlarged diameter shaft portion and a reduced diameter shaft portion, a sleeve outer race surrounding the stepped shaft, and two rows of rotating bodies interposed therebetween, wherein:

the rotating bodies of the first row are disposed between an outer peripheral rolling recess formed directly on an outer peripheral surface of the enlarged diameter shaft portion and a first inner peripheral rolling recess formed directly on the inner peripheral surface of the sleeve outer race, the rotating bodies of the second row are disposed between an outer peripheral rolling recess formed on an outer periphery of an inner race fitted over the reduced diameter shaft portion of said stepped shaft and a second inner peripheral rolling recess formed directly on the inner peripheral surface of the sleeve outer race, an outer peripheral labyrinth recess formed on the outer peripheral surface of the enlarged diameter shaft portion at the longitudinal inner side of the rotating bodies of the first row, a space defined between a shoulder, formed at a point of transition from the enlarged diameter shaft portion to the reduced diameter shaft portion, and an inner end of the inner race, at the longitudinal outer side of the rotating bodies of the first row, a first outer sealing plate of ring shape having a central aperture is fixedly fitted at its outer periphery into an inner peripheral groove formed on the inner peripheral surface of the sleeve outer race, the inner diameter of the central aperture of said first outer sealing plate is slightly larger than the enlarged diameter shaft portion to prevent the first outer sealing plate from contact with the stepped shaft and to provide a labyrinth seal function, at the longitudinal outer side of the rotating bodies of the second row, a second outer sealing plate of ring shape having a central aperture is fixedly fitted at its outer periphery into an inner peripheral groove formed on the inner peripheral surface of the sleeve outer race, the inner diameter of the central aperture of said second outer sealing plate is substantially equal to or smaller than the outer diameter of the inner race and larger than the outer diameter of the reduced diameter shaft portion to provide a labyrinth seal function, at the longitudinal inner side of the rotating bodies of the first row, a first inner sealing plate of ring shape having a central aperture is fixedly fitted at its outer periphery into an inner peripheral groove formed on the inner peripheral surface of the sleeve outer race, the inner diameter of the central aperture of said first inner sealing plate is substantially equal to or smaller than the outer diameter of the enlarged diameter shaft portion and larger than the outer diameter of the labyrinth recess to prevent the first inner sealing plate from contact with the stepped shaft to provide a labyrinth seal function, at the longitudinal inner side of the rotating bodies of the second row, a second inner sealing plate of ring shape having a central aperture is fixedly fitted at its outer periphery into an inner peripheral groove formed on the inner peripheral surface of the sleeve outer race, the inner diameter of the central aperture of said second inner sealing plate is substantially equal to or smaller than the outer diameter of the inner ring and larger than the outer diameter of the reduced diameter shaft portion of the stepped shaft to prevent the second inner sealing plate from contact with the stepped shaft or the inner race to provide a labyrinth seal function.

6. The swing arm assembly recited in claim 5, wherein said compound bearing apparatus is configured so that said outer peripheral labyrinth recess, said space defined between said shoulder and said inner end of the inner race, said first inner sealing plate and said second inner sealing plate cooperate to reduce dispersion of lubricant from said rolling bodies into a space between said two rows of rotating bodies.

* * * * *